United States Patent [19]

Akao

[11] Patent Number: 4,565,733

[45] Date of Patent: Jan. 21, 1986

[54] PACKAGING MATERIAL FOR PHOTOSENSITIVE MATERIALS

[75] Inventor: Mutsuo Akao, Minami-ashigara, Japan

[73] Assignee: Fuji Photo Film Co., Ltd., Minami-Ashigara, Japan

[21] Appl. No.: 605,925

[22] Filed: May 1, 1984

[30] Foreign Application Priority Data

May 2, 1983 [JP] Japan .................................. 58-76271

[51] Int. Cl.$^4$ .......................... B32B 27/32; B32B 3/26
[52] U.S. Cl. .................................. 428/215; 428/317.1; 428/319.7; 428/515; 428/516; 428/910
[58] Field of Search ............ 428/201, 211, 215, 317.1, 428/317.7, 319.7, 319.9, 515, 516, 910

[56] References Cited

U.S. PATENT DOCUMENTS 4,359,499 11/1982 Akao et al. ........................... 428/515
4,469,741 9/1984 Akao et al. ........................... 428/516

*Primary Examiner*—William J. Van Balen
*Attorney, Agent, or Firm*—Burns, Doane, Swecker & Mathis

[57] ABSTRACT

A laminate film of at least three layers comprising a foam-sheet sandwiched between two uniaxially molecular oriented thermoplastic resin films, wherein;

(a) the thickness of the foam-sheet is 0.3–2.0 mm, and the foaming magnification is 5–50 times;

(b) the two uniaxially molecular oriented films are so hot-welded to the both surfaces of the foam-sheet, optionally via a hot-melting adhesive layer, that the respective molecular orientation axes cross each other at an angle of 30 degrees or more; and (c) the thickness of the hot-welded laminate film has been compressed to 40–85% (thickness retention) of the theoretical sum of each layer.

The laminate film preferably contains a light-shielding substance, or light-shielding layer(s) may further be coated thereon, for the use of packaging photosensitive materials.

16 Claims, No Drawings

PACKAGING MATERIAL FOR PHOTOSENSITIVE MATERIALS

FIELD OF THE INVENTION

The present invention relates to a laminate film, which is particularly appropriate for packaging photosensitive materials.

BACKGROUND OF THE INVENTION

Various kinds of laminate films have been practically used in this technical field, and various characteristics are required in accordance with the uses thereof. The necessary characteristics required in almost all packaging films are hardly curling, high impact-strength, flexibility, good heat-sealability for airtight seal, etc. Photographic materials have heretofore been transport by using metallic seal containers, and it is considered that industriallization of airtight sealable laminate films having high impact strength and hardly curling, without decrease of the shock-absorbing property, anti-static property and slip property, if possible, will be able to substitute the laminate film package for the conventional transference means. Moreover, development of any further new uses of the laminate films will be expected, and various practical advantages will be recognized, such that the package is light-weight and hardly broken.

SUMMARY OF THE DISCLOSURE

The subject matter of the present invention is to provide novel laminate films, which are particularly appropriate for packaging photosensitive materials, as mentioned above.

Laminate films of the present invention comprise three layers of a foam-sheet and two uniaxially molecular oriented films laminated on both surfaces of said foam-sheet; characterized in that the two uniaxially molecular oriented films are so hot-welded to the foam-sheet that the respective molecular orientation axes cross each other at an angle of 30 degrees or more, and the thickness of the laminate film has been reduced, or compressed on hot-welding, to 40–85% (thickness retention) of the theoretical sum of each layer.

DETAILED DESCRIPTION OF THE PREFERRED EMBODIMENTS

The foam-sheet of the present invention includes thermoplastic resin foam-sheets comprising one or more components selected from various kinds of polystyrenes; olefin type polymers such as various kinds of polypropylenes, various kinds of polyethylenes and polybutenes; olefin type copolymers such as ethylene-propylene copolymer, ethylene-butene copolymer, ethylene-vinyl acetate copolymer and ethylene-acrylate copolymer; copolymers primarily comprising ethylene, such as chlorinated polyethylene; copolymers primarily comprising propylene; and polyamides, polyacetals, polycarbonates, polyphenylene oxides and mixtures thereof; as well as foamed rubber sheets such as polyurethanes, natural rubber (spongy substance obtained from raw rubber latex) and SBR; and mixtures comprising these main components and other plastic and rubber. The preferred foam-sheets among them, to which the method of the present invention is effectively applicable, are the thermoplastic resin foam-sheets substantially comprising essential components of polystyrene, high-density, middle-density or low-density polyethylene, low-pressure low-density polyethylene (L-LDPE) and/or polypropylene.

The preferred thickness is, when used as a packaging material, 0.3–2.0 mm. The thickness may be made larger in other uses, whereas occurrence of layer-peeling and deterioration of heat-seal property are often inevitable when the thickness is more than 2 mm.

In case the thickness is less than 0.3 mm, on the contrary, the foam-sheet itself is ineffective, and all foams will probably disappear due to the hot-welding for lamination. In addition, some problems occur on the toughness or rigidity, curling, Gerbo-Test strength and perforation strength.

Typical commercial foam-sheets are as follows: Hi-Sheet by Hi-Sheet Industries, Ltd., Softron S and Lightron S by Sekisui Chemical Co., Ltd., Cellhope by Tokyo Kasei Co., Ltd., Esafoam S by Asahi Dow Chemical, Miramat by Nippon Styrene Paper, Foam Ace L by Furukawa Electric Co., Ltd., Finecell by Hitachi Chemical Co., Ltd., PE Sun Foam by Sanwa Kako Co., Ltd., PE-Light by M.T.P. Chemical, which are "polyethylene foam-sheet"; Toray Pef PP by Toray Industries, Inc., Hatsuport by Mitsui Toatsu Chemicals, Inc., which are "polypropylene foam-sheet"; Stylo Foam by Asahi Dow Chemical, Styrene Paper by Nippon Styrene Paper, Esren Sheet by Sekisui Plastics Co., Ltd., Corpearl by Corpearl, Kanefan by Kanegafuchi Chemical Industry Co., Ltd., which are "polystyrene foam-sheet"; and Nippi Foam by Nippi Inc., which is "vinyl chloride foam-sheet". In particular, polystyrene foam-sheets (polystyrene foam-paper) and polyethylene foam-sheets are preferred in view of the cost and characteristics thereof.

The foaming magnification, exerting a considerable influence on the shock-absorbing property, slip property and mechanical strength, is selectively determined in compliance with the use of the foam-sheets. The preferred range is 5–50 times (more preferably 10–30 times).

In case the foaming magnification is more than 50 times, the strength of the foam-sheet itself will seriously decrease, resulting in the occurrence of interlayer-peeling.

In case this is less than 50 times, on the other hand, the impact resistance, particularly Gerbo-Test strength, decreases, and other effective characteristics of the foam-sheet will deteriorate. In addition, the cost of the foam-sheet is high and such foam-sheets are nearly same as conventional films.

The uniaxially molecular oriented film includes thermoplastic resins such as various kinds of polyethylenes, various kinds of polypropylenes, polyesters, polyamides, polycarbonates, polyvinylidene chlorides, polyvinyl chlorides and polystyrenes, as well as copolymers mainly comprising said components, and mixtures of two or more thermoplastic resins herein above mentioned. High-density polyethylenes, middle-density polyethylenes, low-pressure low-density polyethylenes and polypropylenes are preferred, and high-density polyethylenes having a density of 0.945 g/cm$^3$ or more are most preferred.

Two molecular oriented film layers may be of either same or different components. The extent of molecular orientation, elongation magnification and thickness thereof may also be same or different. The uniaxially molecular oriented film mentioned herein includes such films that the extent of molecular orientation of the molecular oriented-direction is larger by 1.5 times or more, than that of the 90 degree-cross direction. For example, an inflation film where the blow ratio is two times and the stretching in the longitudinal direction is three times is a longitudinal-uniaxial three-time-stretched film.

Uniaxially molecular oriented films are, in general, uniaxially stretched films (horizontal-uniaxial-stretched or longitudinal-uniaxial-stretched films by means of a tenter). The present invention additionally includes the technical field of the uniaxially molecular oriented films in the formation of physically shaped films or inflation films (tube films), where the molecular orientation is effected by increasing the blow ratio, or the longitudinal direction is strongly molecular-oriented, followed by cutting spirally and spreaded to obtain a flat film which has been oriented obliquely (e.g., at 45 degrees). The orienting methods are described in Japanese Patent Kokai-Publication Nos. 34656/72 and 100464/73 (corresponding to British Pat. No. 1414681 and U.S. Pat. No. 3,891,374) and Japanese Patent Kokoku-Publication Nos. 5319/65, 38621/72, 39927/72 and 18072/78. Particularly, it is in detail described in Japanese Patent Kokoku-Publication No. 5319/65. The disclosures of the publications hereinabove mentioned are herein incorporated with reference thereto.

The molecular orientation may be in any of longitudinal, horizontal and oblique directions, and it is an indispensable matter that the two molecular oriented films are to be so laminated that the respective molecular orientation axes cross each other at an angle of 30 degrees or more.

When the tensile strength in all directions is required to be kept equivalently average, it is preferred that the cross-angle of the two molecular orientation axes is at 90 degrees. More precisely, a longitudinal molecular oriented film and a horizontal molecular oriented film are laminated as such, or alternatively, two films where the molecular orientation is at 45 degrees in the oblique direction may be laminated at right angles with each other. In the latter case, molecular oriented tubular films or films obtained by tubular stretching-extrusion molding may be laminated as such, without incision, by inserting a foam-sheet into the tubular part.

In case the tensile strength in a certain direction is required to be particularly reinforced, it is advantageous to keep the cross-angle not at 90 degrees but at 30-90 degrees (exclusive of 90 degrees). Whereas, if the cross-angle is too smaller, the tear strength in the direction parallel to the molecular orientation axis or the tensile strength in the perpendicular direction thereto decreases. Therefore, the preferred cross-angle in general packaging films is 30 degrees or more, preferably 45-90 degrees.

The extent of molecular orientation and the elongation magnification are not specifically defined, as being selectively determined in compliance with the components and the use of the products. The elongation effect is apparent within the range of 2-15 times, and when the film contains a light-shielding substance, the range of 2-6 times is especially preferred in view of the film quality having no fish-eye.

The thickness of the film is also selected according to the requirement of the object, and is, in general, within the range of 15-70 microns when used as packaging materials. Two molecular oriented film layers and one sheet layer are hot-welded with each other, by using or not using an interposing hot-melting adhesive layer. It is important, upon hot-welding, that these layers are not merely sticked and laminated but are indispensably to be so compressed that the boundary surface of the foam-sheet is partially melted whereby the thickness of the obtained laminate film becomes smaller than the theoretical sum of each layers. Whereas, any excess compression as to completely compress even the central part of the foam-sheet, resulting in disappearance of almost all the foams therein, must be avoided. The preferred range of the compression degree (as defined below) is 15-60%, where the thickness retention is 85-40%.

Compression degree=(1−thickness of laminate film/theoretical sum of each layer thickness)×100(%)

Due to the compression of the laminate film as mentioned above, the present films have various advantageous characteristics such as prevention of interlayer-peeling, decrease of curling, improvement of flexibility, heat-seal property and processing properties in laminate film formation, prevention of wrinkles, decrease of unevenness in thickness, decrease of rolling diameter and increase of rolling length; as compared with laminate films obtained by mere lamination of the same kinds of three layers.

If the compression degree is less than 15%, the airtight package-applicability is insufficient because of such defects that the interlayer-peeling occurs, the heat-seal is difficult and the fold-formation is not enough to be folded or embossed. In addition, various problems such as wrinkles, uneven thickness and increase of rolling diameter, are inevitable in the manufacture of the laminate films. When the compression degree exceeds 60%, various disadvantageous occur, such as the decrease of Gerbo-Test strength, impact strength and tear strength.

In order to accomplish the said hot-welding, the temperature of the adhesive layer must be correctly selected upon the hot-welding of the thermoplastic resin. The temperature of the thermoplastic resin adhesive layer is preferably within the range of 250°-350° C., more preferably, 280°-320° C. When said adhesive layer temperature is too high, the molecular oriented film or stretched film is hot-shrunk or fused, resulting in occurrence of holes. Moreover, various problems occur that the thermoplastic resin adhesive layer is decomposed or colored, voids in the foam-sheet are destroyed and the shock-absorbing property is lost.

In case the adhesion of the foam sheet and the molecular oriented film is difficult, for example, when the difference of the fusing temperatures between the two kinds of the molecular oriented films is too large, conventional adhesives may optionally be used.

Typical adhesives are polyolefin type thermoplastic resin hot-melting adhesives such as various kinds of polyethylenes, polypropylenes and polybutenes; olefin copolymers such as ethylene-propylene copolymers, ethylene-vinyl acetate copolymers and ethylene-acrylate copolymers; thermoplastic resin hot-melting adhesives such as ionomer resins; and other hot-melting rubber type adhesives and solvent-type rubber adhesives. In this case using the adhesives, it is also important to partially melt the surface layer of the foam-sheet by hot-compressing, but not to merely stick the films with the adhesive.

More concretely, the polyolefin type adhesives include polymers and copolymers comprising polyolefins such as various kinds of polyethylenes, polypropylenes, polybutylenes and EPR; as well as copolymers comprising ethylene and other monomers, such as low-pressure low-density polyethylene (L-LDPE); ionomer resins (ionic copolymers) such as SURLIN by Dupont, ADMER by Mitsui Polychemicals, etc.; and graft-polymers. The melting point of these adhesives is preferably lower than that of the molecular oriented films to be laminated, by 10° C. or more. This is because the hot-melt adhesion is completed without imparting any bad influence to the molecular oriented film, owing to the temperature difference in such degree. The laminate films of the present invention are especially useful for packaging photosensitive materials, and for this, at least one layer among all laminated layers must be light-shieldable. A light-shielding substance may be incorporated in any of at least one or more layers of molecular oriented film, foam-sheet, adesive layer and others; or alternatively, a light-shielding layer such as paper or a metal sheet having a thickness of 5-50 microns, e.g. aluminum foil or zinc-plated thin steel sheet may be laminated; or the light-shielding ability may be imparted by printing.

In the incorporation of the light-shielding substance, the amount thereof is preferably 0.5–12 g, per the unit area ($m^2$) of the entire laminate. Addition of the light-shielding substance of more than 12 $g/m^2$ to the molecular oriented film is inconvenient, as causing the occurrence of fish-eyes and decrease of the physical strength, and a range of 1.5–7 wt% is preferred, which, however, is not limitative to the case when the substance is added to a flexible sheet such as paper. The light-shielding substance includes any and every substance through which visible and ultraviolet rays can not penetrate. Typical examples thereof are various kinds of carbon black, aluminum powder, color pigments, color dyestuffs, white pigments such as titanium oxide, barium sulfate, calcium carbonate and clay; as well as various kinds of metal powder and metal fiber. Among them are preferred various kinds of carbon black, aluminum powder and aluminum paste from which low-volatile substances have been removed, for the formation of packaging films of photosensitive materials, in view of the quality, cost and light-shielding ability.

The indispensable three layers of the present invention, that are two molecular oriented films and one foam-sheet, are mentioned above in detail, and the present invention additionally include other embodiments where other layers are optionally laminated. For example, lamination of a flexible sheet such as various kinds of paper, unwoven fabric or cellophane is considered to improve the heat-seal property, strength, slide property, static property, print property, light-shielding ability and/or appearance.

In particular, in case that one of the outermost layers is formed by disposing a non-hot-melting layer such as paper or a layer having a higher melting point than the other outermost layer by 10° C. or more, the heat-sealing of the other outermost layers each having a lower melting point is easier, which is advantageous for the manufacture of bags of good heat-seal property.

The same effect may be attained by forming one of the outermost layers with using a heat-sealable layer having a lower melting point than the opposite outermost molecular oriented film layer by 10° C. or more, contrary to the above disposition. The formation of the heat-sealable layer may be carried out by any of coating or sticking. For example, one emmbodiment is as follows: One of the outermost stretched film layers is a polyester or a nylon film, and the other outermost layer is polyethylene film. The heat-sealing of this case is easy.

Thus manufactured laminate films having the above mentioned structure have good curl resistance. In addition, these have good tear strength, impact perforation strength, Gerbo-Test strength and drop test strength, and are useful as packaging materials.

In particular, the laminate films are especially useful for packaging photo-sensitive materials, when a light-shielding ability is imparted thereto. One embodiment is as follows: Uniaxial-oblique-stretched film having a thickness of 30 microns and containing 3% of carbon black (where the elongation magnification is 3.5 times) are laminated on both surfaces of a foamed styrene sheet having a thickness of 500 microns, the cross angle of the stretch-axes being 90 degrees, and then, a kraft paper of 40 $g/m^2$ is laminated on one surface thereof and a linear low-pressure low-density polyethylene (L-LDPE) having a thickness of 30 microns, as a heat-sealable layer, is laminated on the other surface, thereby to form a laminate film, where every lamination is carried out by hot-welding, using a hot-melting adhesive layer of high-pressure low-density polyethylene. Thus manufactured film is appropriate for packaging photo-sensitive sheets weighing 5 kg or more. The laminate sheet has various advantageous merits as follows: Impact perforation strength and drop test strength are superior and in addition, complete heat-seal is possible, whereby any possibility of the breakage of the sealed portions may be eliminated. Moreover, the toughness or rigidity is appropriately moderate, and so, it is easy to lap and seal the open end with an adhesive or a tape.

The same fact is recognized, referring to the case of packaging roll films and roll photographic papers. Large-sized roll products have heretofore been transported by using metallic seal-containers. This is because, if bags made of any filmy packaging materials, which are lighter and can advantageously be handled, are used in the transference of said products, various problems have occurred, for example, the package is broken due to the edge of the roll or worn into holes when rubbed or dropped. Anyway, the use of the conventional packaging films is impractical. Contrary to this, it was proved that the laminate films of the present invention have good tear strength and Gerbo-Test strength and these may easily be heat-sealed to form packaging bags, and so, these can be sufficiently utilized for the use of transference of large-sized roll products of photosensitive materials such as monochromatic and color photographic papers and movie films.

EXAMPLES

Examples are given below.

Three kinds of laminate films of the present invention were manuafctured and tested in comparison with three kinds of conventional films, each having the structure as shown in the following Table 1.

A molecular oriented film used herein was a high density polyethylene uniaxial-stretched film (density=0.96/$cm^2$) prepared by using an apparatus of JP-Pat-Kokoku Publication No. 53(1978)-18072. A uniaxial-oblique-stretched film with the elongation magnification of 3.0 times was used. The cross angle of the two stretched film layers was 90 degrees.

A polystyrene foam sheet with a foaming degree of 30 times was used. The lamination was effected at 310° C. by interposing a hot-melting polyethylene adhesive layer. Each compression percentage was 48%, 32% and 45%, and the thickness retention was 52%, 68% and 55%, respectively.

As the result of the comparison experiments, it is recognized that the curl resistance, the tear strength, the impact perforation strength, the Gerbo-Test strength and the drop test strength of all of the three laminate films of the present invention have been extremely improved. The perforation strength of the laminate No. 2 of the present invention which has two additional layers (the other layers are same as the laminate No. 1 of the present invention) is not so improved, but the peeling-static-voltage thereof largely decreased from −450 V to −47 V. Therefore, it is concluded that this is extremely excellent as a packaging film.

TABLE 1

|  | Unit | Conventional No. 1 | Conventional No. 2 | Conventional No. 3 | Present No. 1 | Present No. 2 | Present No. 3 | Testing method |
|---|---|---|---|---|---|---|---|---|
| Total laminate thickness | μm | 200 | 147 | 115 | 318 | 480 | 609 | JISP 8118 |
| Constitution |  |  |  |  |  |  |  |  |
| 1st layer | μm | LDPE film 50 (C3) | Kraft paper (35 g/cm²) | Uniaxial-oblique-stretched high-density polyethylene film (containing 4.5% of carbon) 40 | same as the left | same as the left | same as the left |  |
| 2nd layer (hot-melting adhesive layer) | μm | LDPE 15 | same as the left | same as the left | same as the left | same as the left | same as the left |  |
| 3rd layer | μm | Aluminum foil 7 | Aluminum foil 7 | Aluminum foil 7 | Foamed styrene 500 | same as the left | Foamed styrene 1000 |  |
| 4th layer (hot-melting adhesive layer) | μm | LDPE 15 | same as the left | same as the left | same as the left | same as the left | same as the left |  |
| 5th layer | μm | Kraft paper (35 g/m²) | LDPE 70 (C3) | Uniaxial-oblique-stretched high-density polyethylene film (containing 4.5% of carbon) 40 | same as the left | same as the left | same as the left |  |
| 6th layer (hot-melting adhesive layer) | μm | LDPE 15 |  |  |  | LDPE 15 |  |  |
| 7th layer | μm | LDPE 50 (C3) |  |  |  | Kraft paper (70 g/m²) |  |  |
| Compression percentage |  | — | — | — | 48% (1) | 32% (2) | 45% (3) |  |
| Thickness retention |  | — | — | — | 52% | 68% | 55% |  |
| Tear strength |  |  |  |  |  |  |  |  |
| Longitudinal | g | 294 | 146 | 343 | 408 | 758 | 453 | JISP 8116 |
| Transverse |  | 610 | 258 | 496 | not-cut | not-cut | not-cut |  |
| Impact perforation strength |  |  |  |  |  |  |  |  |
| Front side | kg · cm | 5.1 | 3.8 | 9.3 | 13.8 | 14.7 | 14.7 | JISP 8134 |
| Back side |  | 5.8 | 6.1 | 10.6 | 14.0 | 14.1 | 14.8 |  |
| Curl resistance (value) | (cm) | good (2.5) | no-good (14) | no-good (8.7) | excellent (1.1) | excellent (1.5) | excellent (0.7) | (10 − 1) cm |
| Gerbo-Test strength | Number of times | 18 | 5 | 16 | 200 | 200–300 | 300 or more | (4) |
| Drop test number | Number of | 1 | 1 | 3 | 10 | 13 | 12 | (5) |

TABLE 1-continued

| | Unit | Conventional No. 1 | Conventional No. 2 | Conventional No. 3 | Present No. 1 | Present No. 2 | Present No. 3 | Testing method |
|---|---|---|---|---|---|---|---|---|
| | times | | | | | | | |

Notes:
(C3): containing 3 wt % of carbon black
LDPE: low density polyethylene (1) $\left(1 - \frac{318}{610}\right) \times 100 = 48\%$ (2) $\left(1 - \frac{480}{710}\right) \times 100 = 32\%$ (3) $\left(1 - \frac{609}{1110}\right) \times 100 = 45\%$ (4) Gerbo-Test measuring method: according to the United States Army MIL B 131 (flexible moisture-proof barrier material testing method)
(5) Drop test number measuring method: A roll film weighing 5 kg was put in a three-side-sealed flat bag (sealed width: 10 mm) made of each laminate film sample as above, from the open side thereof, and then the open side was folded triply and sealedwith an adhesive tape. This was repeatedly dropped down to the earth from the height of 1 m, and the number of times was counted till the laminate film was broken due to the corner edge of the roll film.

The embodiments hereinabove exemplified are presented not for a limitative purpose and modifications apparent in the art may be made without departing from the concept and scope of the present invention as herein disclosed and claimed hereinbelow.

What is claimed is:

1. A laminate film comprising at least three layers comprised of a foam-sheet sandwiched between two uniaxially molecular oriented thermoplastic resin films, wherein:
    (a) the thickness of the foam-sheet is 0.3-2.0 mm, and the foaming magnification is 5-50 times;
    (b) the two uniaxially molecular oriented films are so hot-welded to the both surfaces of the foam-sheet, without or with an interposing hot-melting adhesive layer therebetween, that the respective molecular orientation axes cross each other at an angle of 30 degrees or more; and
    (c) the thickness of the hot-welded laminate film has been compressed to 40-85% (thickness retention) of the theoretical sum of each layers.

2. The laminate film as defined in claim 1, wherein the said foam-sheet is polyethylene, polypropylene, polystyrene, polyurethane, a copolymer of said resin and another resin, and a blended mixture thereof.

3. The laminate film for packaging photosensitive materials, as defined in claim 1, wherein any one or more layers of the said foam-sheet and the said molecular oriented films contains a light-shielding substance.

4. The laminate film as defined in claim 1, wherein an easily heat-sealable layer, which has a lower melting point than the molecular oriented film by 10° C. or more, is provided on the other surface of one layer of the said molecular oriented films.

5. The laminate film as defined in claim 1, wherein both two layers of the said molecular oriented films are a high density polyethylene having a density of 0.94 g/cm³ or more and a thickness of 15-70 microns.

6. The laminate film for packaging photosensitive materials, as defined in claim 1, wherein both two layers of the said molecular oriented films are a high density polyethylene oblique-molecular-oriented film having a density of 0.94 g/cm³ or more and containing 1-7 wt% of carbon black.

7. The laminate film as defined in claim 1, wherein the said laminate film is a photosensitive material packaging film and contains 0.5-12 g/m² of a light-shielding substance in the entire laminate film.

8. The laminate film as defined in claim 1, wherein one additional flexible sheet layer, which is more heat-resistant than the molecular oriented films, by 10° C. or more, is laminated on the outer surface of any one layer of the said molecular oriented films.

9. The laminate film for packaging photosensitive materials, as defined in claim 1, wherein a flexible sheet having a thickness of 30 microns or more is laminated on the outer surface of any one layer of the said molecular oriented films, as a light-shielding and/or heat-resistant layer.

10. The laminate film for packaging photosensitive materials, as defined in claim 1, wherein;
    the said uniaxially molecular oriented film is a high density polyethylene-uniaxially-stretched film having a density of 0.94 g/cm³ or more, the elongation magnification thereof is 2-6 times and the film contains 1-7 wt% of carbon black;
    the said hot-melting adhesive layer is a polyolefin type thermoplastic resin, and the layers are hot-welded at 250°-350° C.; and
    the said foam-sheet is substantially comprised of polyethylene, polypropylene and/or polystyrene.

11. The laminate film for packaging photosensitve materials, as defined in claim 1 wherein;
    the said uniaxially molecular oriented film as a high density polyethylene-uniaxially oblique-stretched-film having a density of 0.94 g/cm³ or more and a thickness of 15-70 microns, the elongation magnification is 2-6 times, the film contains 1-7 wt% of carbon black, and the cross angle of the stretch-axes of the two stretched film layers is 45-90 degrees;
    the said hot-melting adhesive layer is a polyolefin type thermoplastic resin, and the layers are hot-welded at 250°-350° C.; and
    the said foam-sheet is substantially comprised of polyethylene, polypropylene and/or polystyrene.

12. The laminate film as defined in claim 7, wherein the laminate film further includes an additional light-shielding layer.

13. The laminate film as defined in claim 12, wherein the said light-shielding layer includes a metallic foil, deposited metal layer, or a printed light-shielding layer.

14. The laminate film as defined in claim 9, wherein the flexible sheet is paper, unwoven fabric or cellophane.

15. The laminate film as defined in claim 1, wherein the hot-melting adhesive layer is comprised of one or a blended resin selected from the group consisting of polyolefine type thermoplastic resins, olefin copolymer resins, ionomer resins, hot-melt type rubber, and solvent type rubber.

16. The laminate film as defined in claim 1, wherein the hot-melting adhesive layer is a hot-melt thermoplastic resin having a lower melting point by 10 degrees than the uniaxially molecular oriented thermoplastic resin film to be laminated.

* * * * *